Dec. 2, 1930.   W. R. GRISWOLD   1,783,614
MOTOR VEHICLE
Filed June 13, 1927
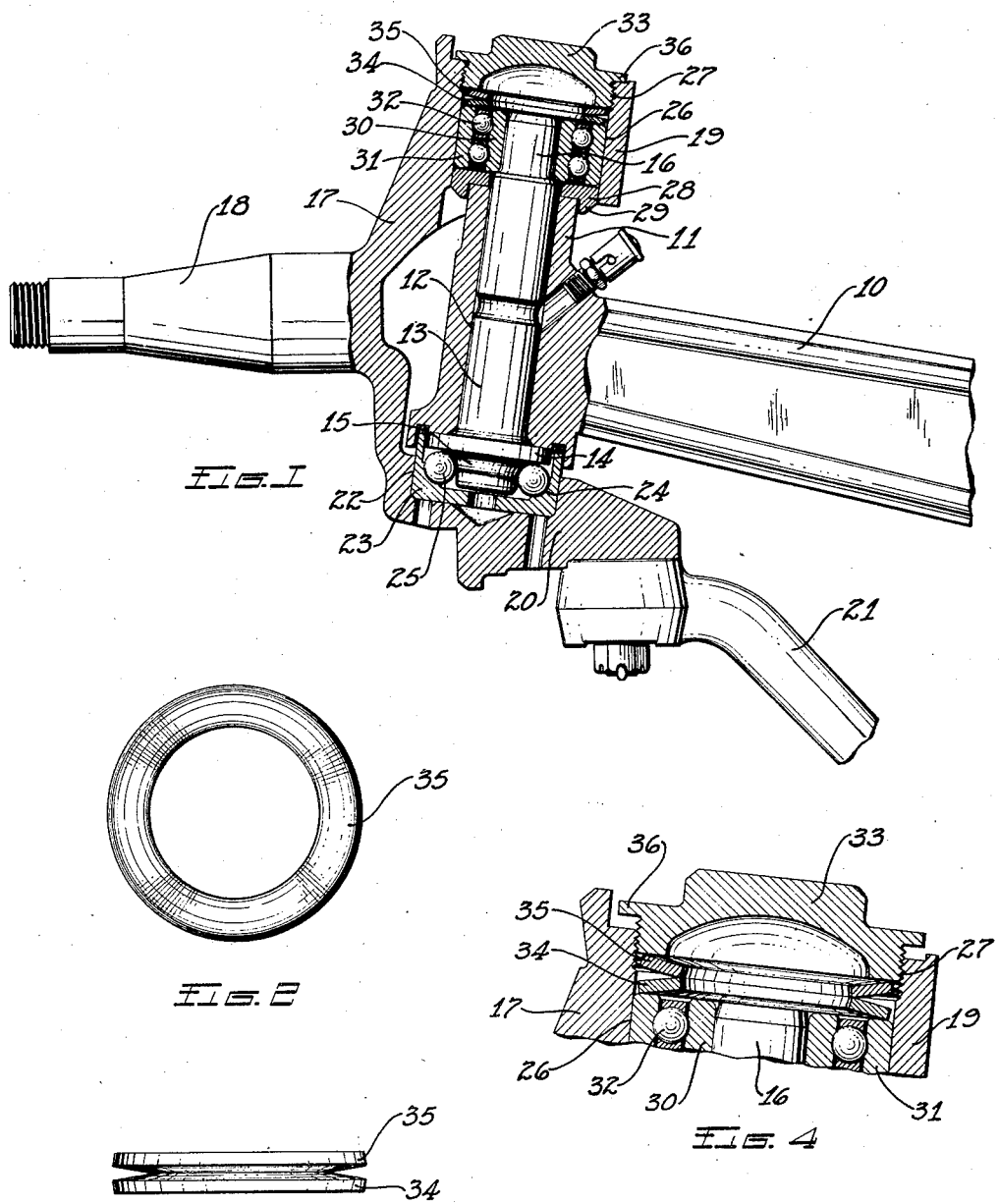
Inventor
WALTER R. GRISWOLD.
By
Attorney Patented Dec. 2, 1930

1,783,614

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed June 13, 1927. Serial No. 198,683.

This invention relates to motor vehicles and particularly to the steering knuckles thereof.

It has been the practice in assembling steering knuckles to clamp the bearings for the pivot pin in position by inserting a nest of shims between the upper outer bearing race and the cap for the pivot pin. By this method it has been found possible to impose an excessive thrust load on the bearings resulting in injury to the ball races and thus causing unsatisfactory steering conditions. It has also been found that the shims frequently have small burrs on their edges so that if the bearings are set up with the correct thrust load when the shims are new, the bearings will loosen up and rattle considerably when these burrs become hammered down in use.

An object of this invention is to provide means to prevent the bearings of a steering knuckle pin from being assembled with an excessive thrust load.

Another object of the invention is to provide means for assembling the bearings of a steering knuckle pin with a thrust load which may be predetermined.

Another object of the invention is to provide means for assembling the bearings of a steering knuckle pin with a constant pressure thereon which can be readily determined and which will at all times follow up any wear of the parts.

A further object of the invention is to provide means for assembling the bearings of a steering knuckle pin, permitting free oscillation without perceptible vertical movement.

A still further object of the invention is to provide an expansible cushion for retaining in position the bearings of a steering knuckle pin, the cushion having the advantage of being highly efficient in operation and yet of marked simplicity so that its manufacture is economically facilitated.

Other objects of the invention will appear from the following description taken in connection with the drawings, which form a part of this specification, and in which:

Fig. 1 is an elevation, partly in section, of one end of the front axle of a motor vehicle with a steering knuckle mounted thereon;

Fig. 2 is a top plan view of one of the washers;

Fig. 3 is an elevation of a pair of washers assembled, and

Fig. 4 is a fragmentary view, in section, illustrating the washers assembled in place and partly compressed.

Referring to the drawings, 10 represents a front or steering axle of a motor vehicle and 17 is a steering spindle adapted to be pivoted thereon. Thus there is an axle member 10 and a spindle member 17 forming a steering knuckle, one at either end of the axle.

The outer end of the axle 10 is shown as somewhat enlarged at 11 and it is bored out as indicated at 12 to take the usual steering knuckle pin 13, this pin fitting closely in the bore 12 and having a radial flange 14 which abuts against the lower face of the end of the axle. The pin 13 extends slightly above and below the axle part and into separated bosses 19 and 20 of the spindle member 17. These bosses are shown as rigid or integral parts of the spindle member 17 which member is also formed with a spindle 18 upon which the vehicle wheel is adapted to be mounted. A lever 21 is secured to the lower boss 20 of the spindle member for oscillating the latter about the pin 13 as will hereinafter appear.

Separated ball bearings are arranged between the axle member and the spindle member to support the one on the other and to provide easy turning of the spindle member. The lower ball bearing comprises a cup 23 pressed into a recess 22 in the boss 20 and forming a ball race 24 for the balls 25, the pin 13 providing the opposing race 15 for the balls. This ball bearing is largely a thrust bearing but it also takes radial loads and retains the lower end of the pin 13 in position.

The boss 19 has a bore 26 aligned with the recess 22 in the boss 20 and is provided at its upper end with internal threads 27. A washer 28 fits closely in the bore 26, surrounds the upper end 16 of the knuckle pin 13, and has a flange 29 extending down over the upper end of the enlarged part 11 of the axle.

A double row ball bearing is arranged between the upper end 16 of the pin 13 and the boss 19, this bearing comprising an inner race 30 which rests against the shoulder at the lower end of the part 16 of the pin, an outer race 31 fitted in the bore 26, and a double row of balls 32 arranged between the inner and outer races. Normally this bearing takes only the radial load between the pin and the spindle member, but it is also adapted to take thrust loads as when the direction of the thrust is reversed. This happens for example when the wheel is lifted by the axle as in going over a rough road, the axle will be lifted by the vehicle and pull the wheel up with it or the wheel will drop into a hole and be suspended by the axle.

In prior constructions the parts have been clamped in position by a nut and shims used to obtain the desired tightness of the bearings, but with such constructions it was possible to screw the nut down too far and thus impose an excessive initial thrust load on the bearings, sometimes resulting in a failure thereof and often causing unsatisfactory steering conditions. To maintain a correct initial thrust load on the bearings, the present invention provides a nut or cap 33 threaded into the upper end of the boss 19 and having a flange 36 which limits the travel of the nut and gives it a definite non-adjustable clamping position. Between the inner face of the nut 33 and the outer race 31 of the upper ball bearing is arranged a spring means which is adapted to exert relatively slight pressure under normal conditions but is collapsible in a small compass so that it forms a washer means when it is fully collapsed. This spring means is shown as comprising two washers 34 and 35 which are preferably of somewhat convex form and are placed in position with opposite convexity so that only the peripheries of the washers will be in contact with the nut 33 and the outer ball race 31 of the upper bearing.

It will be understood that the outer race 31 of the upper bearing does not contact with the washer 28 but that the outer race 31 rests against the washer 34 and thrust is transmitted through the balls to the inner race 30 which abuts against the flange of the end 16 of the pin 13. As the nut 33 is threaded into place the washers 34 and 35 are slightly compressed and they are so designed that when the flange 36 is tight against the boss the desired normal pressure will be exerted by the spring washer to thereby clamp all of the parts in position while providing a free oscillation of the spindle member 16 without perceptible vertical float. The normal thrust load on the bearing is thus determined by the design of the washers which have sufficient tension to provide against end play. In practice these washers are designed to provide a normal maximum pressure of from six to eight pounds with the scales applied at the end of the spindle when assembling, which is well within the working limits of the bearing. This is also sufficient to prevent any upward movement of the axle relative to the spindle member under ordinary conditions but the washers 34—35 will yield if there is an excessive upward thrust of the axle.

While I have herein described in some detail a specific embodiment of my invention, which I deem to be new and advantageous and may specifically claim, I do not desire it to be understood that my invention is limited to the exact details of construction, as it will be apparent that changes may be made therein without departing from the spirit or scope of the invention.

Having thus described the various features of my invention, what I claim as new and desire to secure by Letters Patent is:

1. In a steering knuckle, the combination with the axle member and the spindle member, of separated ball bearings between the members, each adapted to take thrust as well as radial load, and means acting through the bearings to clamp the axle member between separated rigid parts of the spindle member comprising a nut and spring means, substantially as described.

2. In a steering knuckle, the combination with the axle member and the spindle member, of separated ball bearings between the members, each adapted to take thrust as well as radial load, and means acting through the bearings to clamp the axle member between separated rigid parts of the spindle member comprising a nut threaded to the spindle member and spring means collapsible in small compass and adapted normally to exert slight thrust through the adjacent bearing.

3. In a steering knuckle, the combination with the axle member having a knuckle pin and the spindle member, of bearing means between said members comprising a ball thrust bearing at one end of said pin taking the normal thrust load of the knuckle, a radial ball bearing at the other end of said pin adapted to take abnormal or reverse thrusts of the knuckle, a clamping nut adapted to clamp said pin through both said bearings between separated rigid parts of the spindle member, said nut having a definite non-adjustable clamping position, and spring means between said nut and a part of said radial bearing determining the normal thrust through said radial bearing.

4. In a steering knuckle, the combination with the axle member having a knuckle pin and the spindle member, of ball bearings between the members at the ends of the pin, and means for clamping the pin between separated rigid parts of the spindle member and through said bearings comprising a nut threaded to the spindle member and spring means between the nut and a part of the adjacent bearing determining the normal thrust through said adjacent bearing.

5. In a motor vehicle, an axle having a pivot pin, a knuckle member, bearings connecting said member to said pin, a cap in the knuckle member above the pin, and an expansible washer between one of the bearings and the cap, said cap having a flange for limiting its travel and thereby limiting the pressure on the washer.

6. In a motor vehicle, the combination of an axle having a pivot pin, a knuckle member, bearings connecting said knuckle member to said pin, the bearings being spaced apart one above and the other below the axle, a clamping member mounted in the knuckle member above the pivot pin, concavo-convex spring washers assembled with their respective convex faces toward each other and arranged between the upper bearing and the clamping member, and means comprising a shoulder on the clamping member for limiting the travel of the clamping member and thereby limiting pressure on the washers.

7. In a steering knuckle, the combination with the axle member and the spindle member, one of said members being yoked to form separated bosses between which bosses the other member is arranged, a knuckle pin extending through one of said members and into the separated bosses of the other said member, a radial bearing in the upper boss for the upper end of said pin, a thrust bearing taking the normal thrust load, and spring means taking the opposite or abnormal thrust load.

In testimony whereof I affix my signature.

WALTER R. GRISWOLD.